United States Patent [19]
Lloyd et al.

[11] Patent Number: 5,839,873
[45] Date of Patent: Nov. 24, 1998

[54] STORAGE AND RETRIEVAL MACHINE WITH PRE-TENSIONED SHUTTLE GUIDES

[75] Inventors: Kurt M. Lloyd, Pewaukee, Wis.; Lamar A. Jones, Sandy, Utah

[73] Assignee: HK Systems, Inc., New Berlin, Wis.

[21] Appl. No.: 623,407

[22] Filed: Mar. 28, 1996

[51] Int. Cl.⁶ .................................................. B65G 1/00
[52] U.S. Cl. ...................... 414/280; 414/282; 414/661
[58] Field of Search .................................. 414/277, 280, 414/282, 659, 661, 662, 663, 749; 901/21; 105/155; 104/94, 139

[56] References Cited

U.S. PATENT DOCUMENTS

| | | | |
|---|---|---|---|
| 3,889,821 | 6/1975 | Bowers et al. ........................... | 414/749 |
| 4,172,423 | 10/1979 | Monne ..................................... | 104/94 |
| 4,388,033 | 6/1983 | Pipes ....................................... | 414/282 |
| 4,458,808 | 7/1984 | Loomer ................................ | 414/749 X |
| 4,938,087 | 7/1990 | Ragard ................................ | 414/749 X |
| 4,988,262 | 1/1991 | Gines .................................. | 414/282 X |
| 5,015,140 | 5/1991 | Kling ..................................... | 414/282 |
| 5,207,555 | 5/1993 | Shirai .................................. | 414/282 X |
| 5,275,064 | 1/1994 | Hobbs ................................. | 414/749 X |
| 5,397,211 | 3/1995 | Lloyd et al. ............................ | 414/663 |
| 5,405,232 | 4/1995 | Lloyd et al. ............................ | 414/280 |
| 5,460,475 | 10/1995 | Lloyd et al. ............................ | 414/659 |

*Primary Examiner*—James W. Keenan
*Attorney, Agent, or Firm*—Nilles & Nilles, S.C.

[57] ABSTRACT

A storage and retrieval machine has a telescopically extendible shuttle assembly which includes a plurality of linearly movable plates and a plurality of shuttle guide roller assemblies which accommodate non-linearities in the guide surface and other variations in clearance between the shuttle guide rollers and the corresponding guide surfaces of the shuttle assembly. Each shuttle guide roller assembly includes a spring, preferably a die spring, which biases the guide roller towards the guide surface but which permits limited deflection of the roller when it encounters bows, bumps, or other variations in linearity in the guide surface. The pre-tensioned guide rollers provide wear compensation, center the shuttle plates on their tracks, and assure adequate guidance of the shuttle plates during shuttle telescoping while preventing premature wear of the shuttle guide roller bearings and/or the guide surfaces.

14 Claims, 9 Drawing Sheets

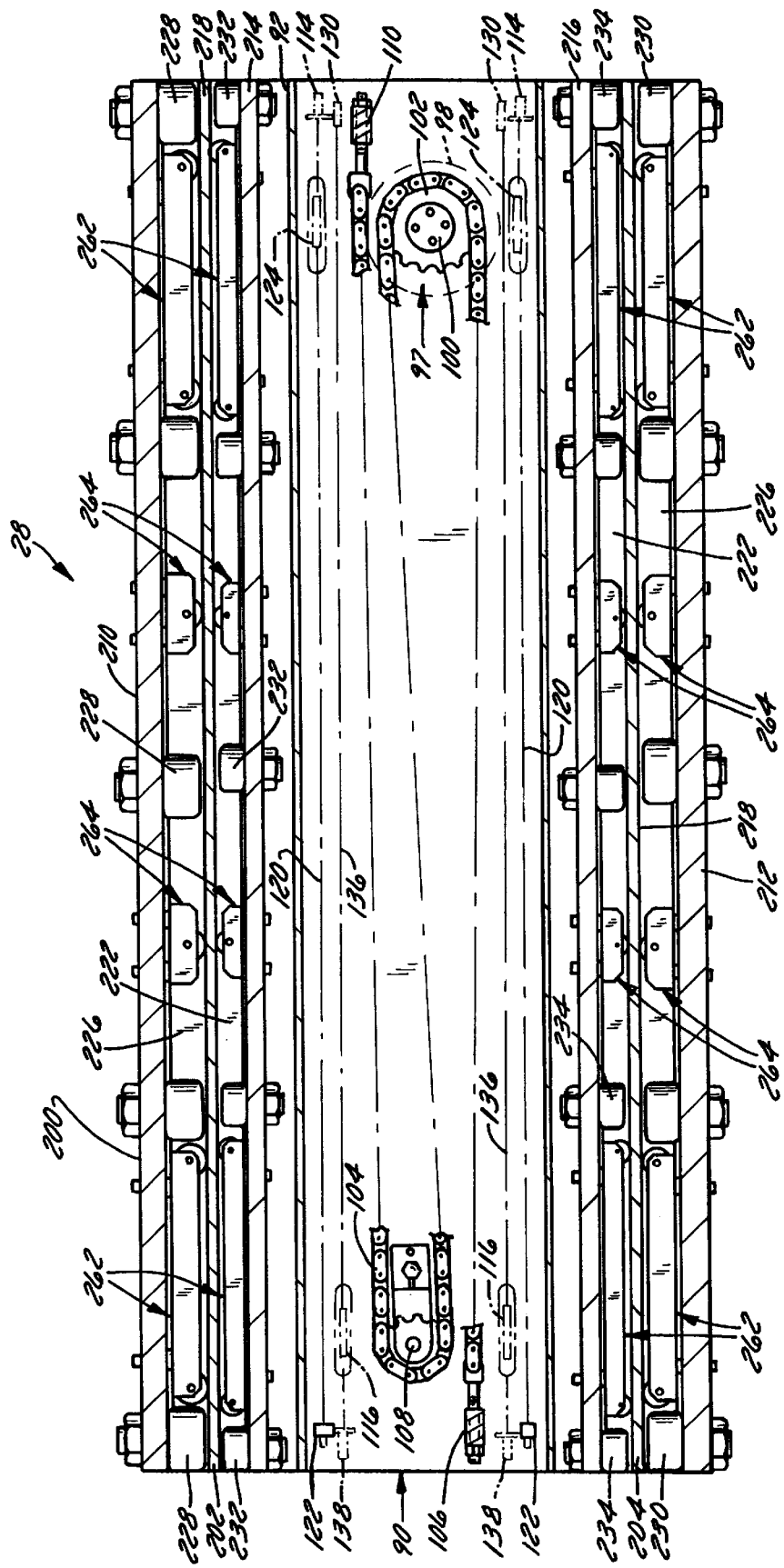

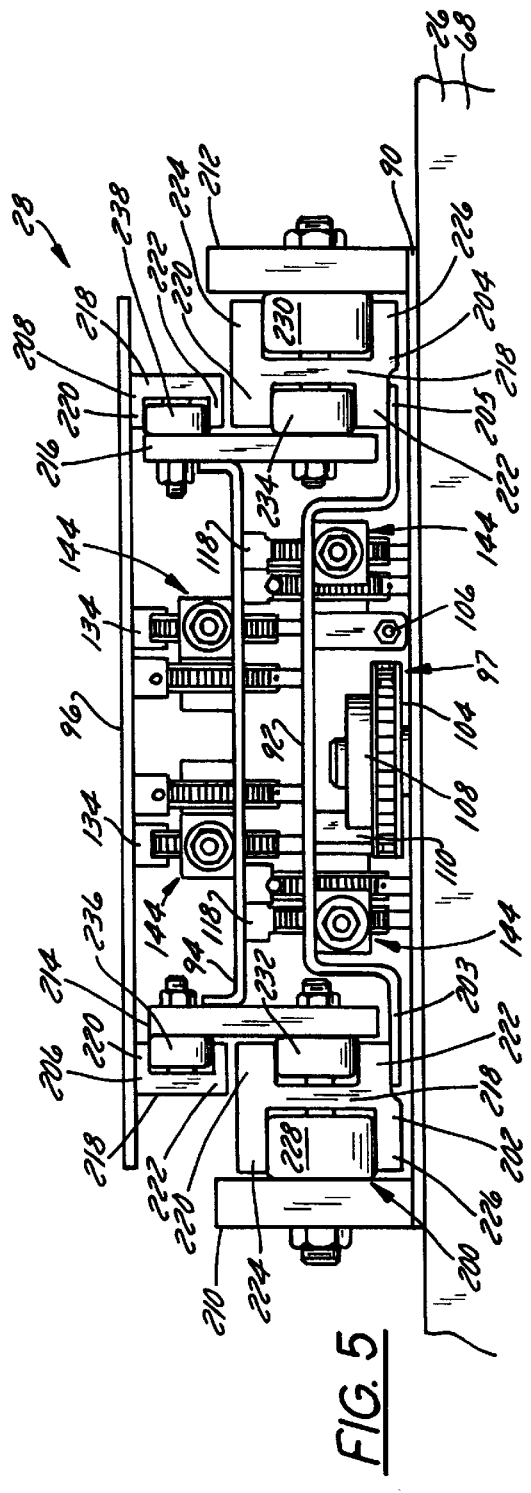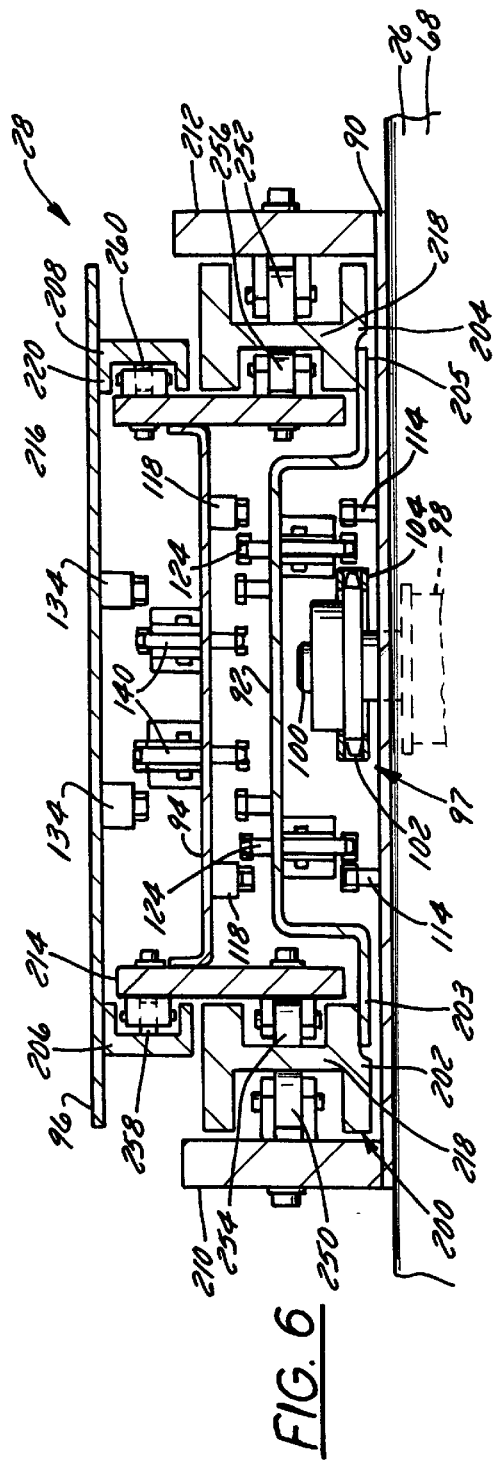

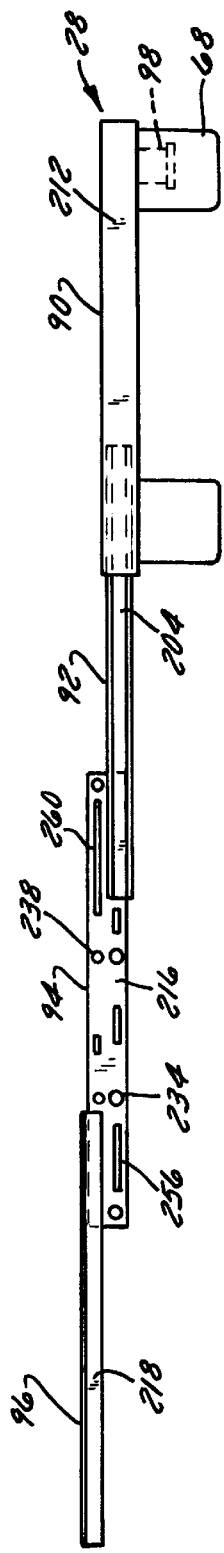
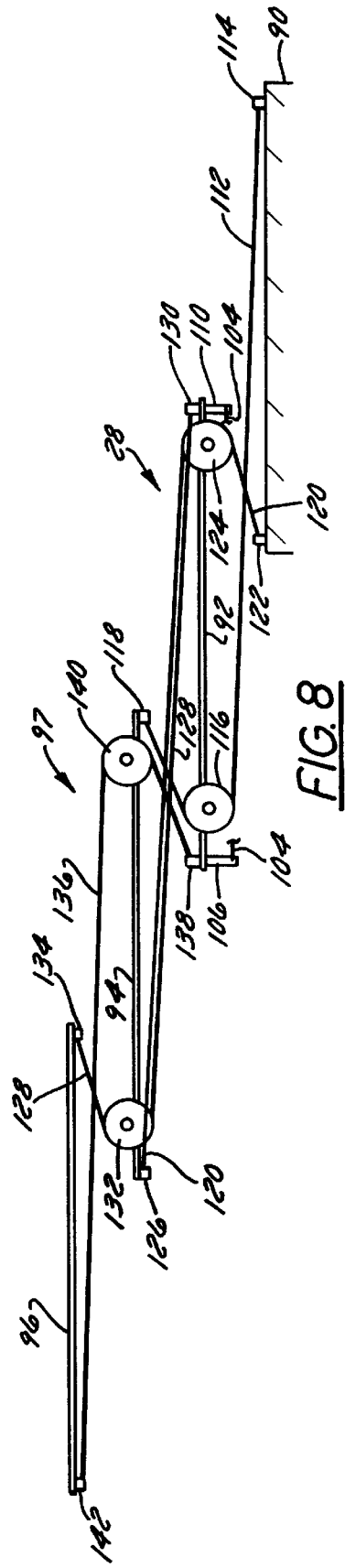
FIG.7
FIG.8

STORAGE AND RETRIEVAL MACHINE WITH PRE-TENSIONED SHUTTLE GUIDES

BACKGROUND OF THE INVENTION

1. Field of the Invention

The invention relates to a storage and retrieval machine having a telescoping shuttle assembly and, more particularly, to pre-tensioned shuttle guide rollers for guiding plates of the shuttle assembly during telescopic extension and retraction of the shuttle assembly while accommodating nonlinearities in shuttle guide surfaces or otherwise accommodating variations in clearance between guide surfaces of the shuttle assembly.

2. Discussion of the Related Art

Storage and retrieval machines are widely used in material and inventory storage facilities for storing items and retrieving the items from designated locations in the facilities. Typical of such facilities are warehouses in which are disposed rows with aisles being defined between adjacent rows. A plurality of stacked storage racks are arranged in rows with aisles being defined between each pair of adjacent rows. Each storage rack is typically suitable for holding a single item. The items to be stored on and retrieved from the storage racks may comprise boxes, pallets, or other similar items of virtually any size and weight and may even comprise very large items such as automobile bodies.

The typical storage and retrieval machine is self-propelled by an electric drive motor and travels to and from the designated aisle locations under signals provided from a remote source. The storage and retrieval machine includes a base configured for horizontal movement along a rail or another support surface, a mast mounted on the base, a carriage mounted on the mast and configured for vertical movement along the mast, and a telescoping shuttle assembly mounted on the carriage. The shuttle assembly typically comprises a base plate and two or more additional plates which overlie the base plate and which are movable fore and aft with respect to the base plate (transversely with respect to the mast) to provide the desired telescopic motion.

In use, once the base is positioned adjacent a designated stack of racks, the carriage is raised along the mast to a position adjacent a designated rack. The shuttle then telescopes transversely with respect to the mast to insert an item into or retrieve the item from the rack.

Telescopic extension and retraction of the shuttle assembly plates may be effected by way of a system of flexible members typically comprising a master guide member and plurality of slave drive members. The master drive member typically comprises either a cable or a chain (1) driven by a sprocket or pulley mounted on the lowermost (stationary) plate of the shuttle and (2) having opposed ends attached to front and rear end portions of a vertically adjacent movable plate. Each of the slave members (1) has a first end attached to a first end of one plate, (2) extends over an idler pulley located at the opposite end of a second, vertically adjacent plate, and (3) extends back to a first end of a third plate disposed vertically above the second plate. Two sets of slave members, typically chains, are provided for each of the second movable and subsequent plates, one set for driving the plate in a forward direction and one set for driving the plate in a rearward direction.

Each of the movable plates of the shuttle assembly is guided for telescopic extension by multiple sets of load-bearing rollers and guide rollers which engage corresponding support and guide surfaces mounted on an underlying or overlying plate. The shuttle guide rollers are designed to inhibit or prevent wobbling or transverse movement of the shuttle plates as they telescope in and out. Precise lateral positioning of the shuttle guide rollers is critical because if they are spaced too far from the roller, they will not contact the guide surface and will not guide the plates. Conversely, if they are spaced too close to the guide surface, excessive stresses will be imposed on the rollers by the guide surface, leading to premature wear or even failure of the guide surface, the roller surface, and/or the roller's bearing.

Shuttle guide roller adjustment historically has been performed by inserting one or more shims between the roller support and the support bar on which the roller is mounted. A trial and error approach was historically used, with the operator inserting and removing the shims until the desired engagement of the roller with the guide surface was achieved. This trial and error process is difficult and timeconsuming, particularly since at least some of the guide rollers are not easily accessible even when the shuttle assembly is in its fully extended or telescoped state. Indeed, in some shuttle assemblies having three or more movable shuttle plates, at least some of the guide rollers cannot be easily accessed without partially disassembling the shuttle assembly. These problems are exasperated by the fact that additional shims must be added periodically to compensate for roller and guide surface wear.

Another problem associated with setting the position of a shuttle guide roller by using shims or similar methods is that the lateral position of the guide roller is fixed after the shimming operation. The guide roller therefore cannot flex laterally to accommodate variations in clearance between the roller and the guide surface arising, e.g., from non-linearities in the guide surface. Accordingly, as the roller travels along the guide surface during telescopic extension or retraction of the shuttle assembly, the roller may encounter outward bows in the guide surface where it does not contact the guide surface at all. Even worse, the roller may encounter inward bows in the guide surface which result in the imposition of very high stresses on both the roller and the guide surface, leading to premature roller wear, guide surface deformation, or even shuttle jamming.

OBJECTS AND SUMMARY OF THE INVENTION

It is therefore a first primary object of the invention to provide a storage and retrieval machine with a shuttle assembly having guide rollers configured to accommodate roller or guide surface wear as well as variations in clearance between a guide roller of the shuttle assembly and the corresponding guide surface of the shuttle assembly.

A second primary object of the invention is to provide a guide roller assembly meeting the first primary object of the invention but not requiring shims or other devices to adjust the nominal position of the guide roller relative to the guide surface.

A third primary object of the invention is to provide guide roller assemblies which center a shuttle plate of a storage and retrieval machine on the rails or other surfaces along which it is driven.

A secondary object of the invention is to provide a guide roller assembly which meets the first and second primary objects of the invention and which is relatively simple to fabricate and to install.

Another secondary object of the invention is to provide a guide roller assembly which meets the first and second primary objects of the invention but which need not be adjusted after initial installation.

In accordance with a first aspect of the invention, these objects are achieved by providing a storage and retrieval machine comprising a base configured for horizontal movement with respect to a support surface, a mast mounted on the base, a carriage mounted on the mast and configured for vertical movement along the mast, and a shuttle assembly supported on the carriage. The shuttle assembly includes a first plate, a second plate which is positioned above the first plate and which is movable fore and aft with respect to the first plate, and a rail which is attached to one of the first and second plates and which is located between the first and second plates. The rail includes a central web and a flange extending laterally away from the web. A main support bar is attached to the other of the first and second plates, is positioned vertically between the first and second plates, and extends substantially in parallel with the rail. Load-bearing rollers are attached to the main support bar so as to be rotatable about a horizontal axis. The load-bearing rollers engage the flange of the rail to support the second plate on the first plate. A shuttle guide roller assembly is provided and includes (1) a guide roller which is supported on the main support bar so as to be rotatable about a vertical axis, so as to engage the web of the rail, and so as to be capable of limited transverse movement with respect to the guide bar, and (2) a spring which biases the guide roller towards the web.

Preferably, the shuttle guide roller assembly further comprises a guide roller support bar which is attached to the main support bar and which has an inner face, an outer face, a front end, and a rear end. The guide roller is mounted on the guide roller support bar and extending inwardly from the inner face. The outer face has a counterbore formed therein. The spring preferably comprises a die spring which engages the main support bar and a portion of which is disposed within the counterbore in the outer face of the guide roller support bar.

Still another primary object of the invention is to provide a method of accommodating variations in clearance between a guide roller of a shuttle guide roller assembly and the corresponding guide surface of the guide roller assembly and to simultaneously center the plate on the shuttle assembly.

In accordance with another aspect of the invention, this object is achieved by providing a method including driving a first plate of a shuttle assembly of a storage and retrieval machine to move fore and aft with respect to a second plate of the shuttle assembly, the second plate being spaced located above the first plate. An additional step includes guiding the second plate while the second plate moves fore and aft with respect to the first plate via rolling engagement of a guide roller with a rail, the rail being mounted on one of the first and second plates and being disposed vertically between the first and second plates, the guide roller being mounted on a guide roller support bar so as to be rotatable about a vertical axis, and the guide roller support bar being mounted on a main support bar which is attached to the other of the first and second plates and which is positioned vertically between the first and second plates. A final step includes accommodating variations in clearance between the main support bar and the rail by permitting limited transverse movement of the guide roller support bar with respect to the main support bar, the limited transverse movement being resisted by a spring biasing the guide roller support bar towards the rail.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 is a sectional top plan view of a shuttle assembly of the storage and retrieval machine of FIGS. 1–3;

FIG. 5 is an end elevation view of the shuttle assembly of FIG. 4;

FIG. 6 is a sectional end elevation view of the shuttle assembly of FIGS. 4 and 5;

FIG. 7 is a partially schematic view of the shuttle assembly of FIGS. 5 and 6, illustrating the shuttle assembly in a fully-extended position;

FIG. 8 is a fully schematic view of the shuttle assembly of FIGS. 5–7, illustrating the shuttle assembly in a fully-extended position, and illustrating the relationship between the plates, idler pulleys, and slave chains of the shuttle assembly;

DETAILED DESCRIPTION OF THE PREFERRED EMBODIMENT

1. Resume

Pursuant to the invention, a storage and retrieval machine is provided having a telescopically extendible shuttle assembly which includes a plurality of linearly movable plates and a plurality of shuttle guide roller assemblies which accommodate non-linearities in the guide surface and other variations in clearance between the shuttle guide rollers and the corresponding guide surfaces of the shuttle assembly. Each shuttle guide roller assembly includes a spring, preferably a die spring, which biases the guide roller towards the guide surface but which permits limited deflection of the roller when it encounters bows, bumps, or other variations in linearity in the guide surface. The pre-tensioned guide rollers provide wear compensation, center the shuttle plates on their tracks, and assure adequate guidance of the shuttle plates during shuttle telescoping while preventing premature wear of the shuttle guide roller bearings and/or the guide surfaces.

2. System Overview

Figure 1:
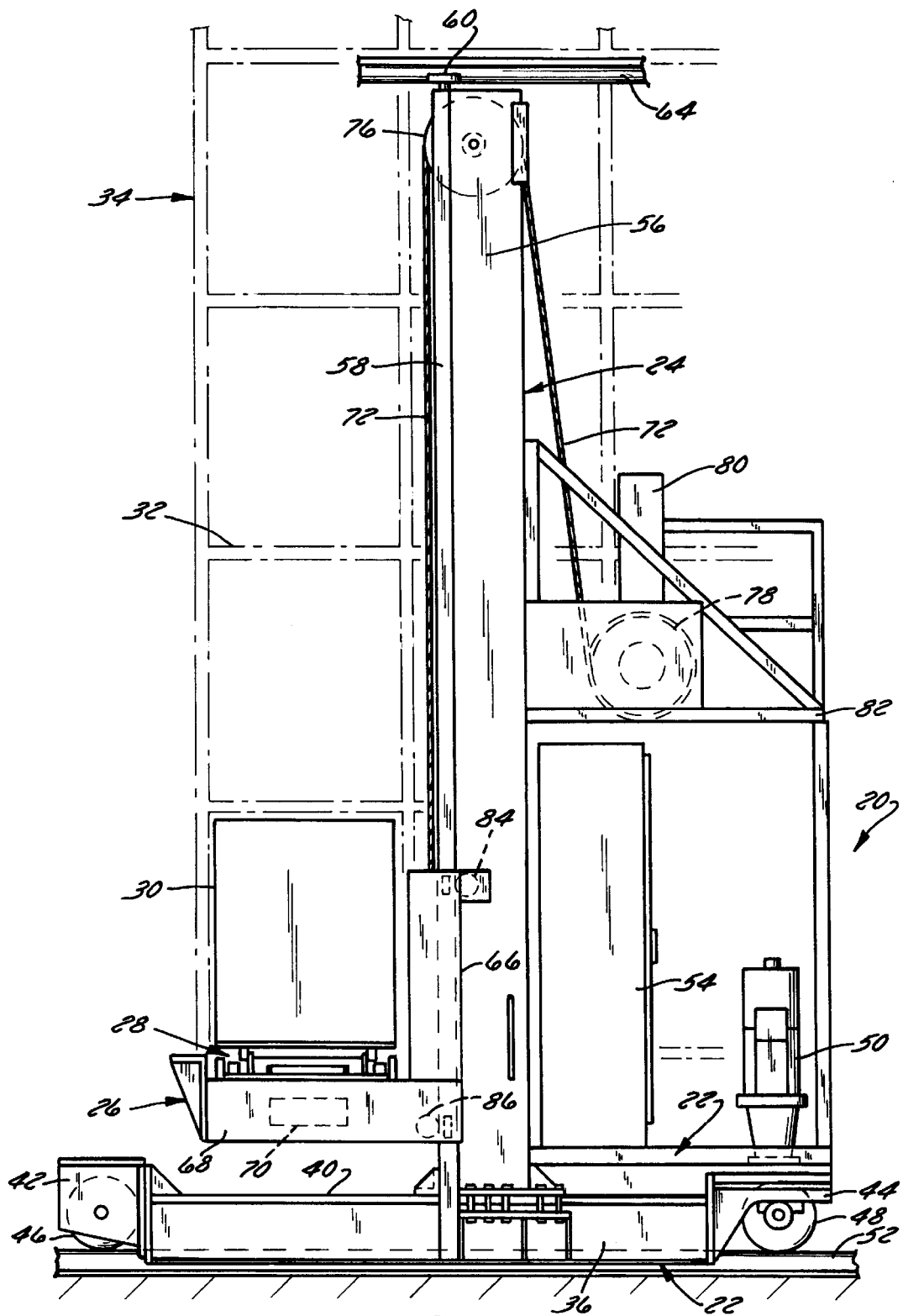
FIG. 1 is a side elevation view of a single mast, one shuttle storage and retrieval machine having a shuttle guide roller assembly constructed in accordance with a preferred embodiment of the invention.
Figure 2:
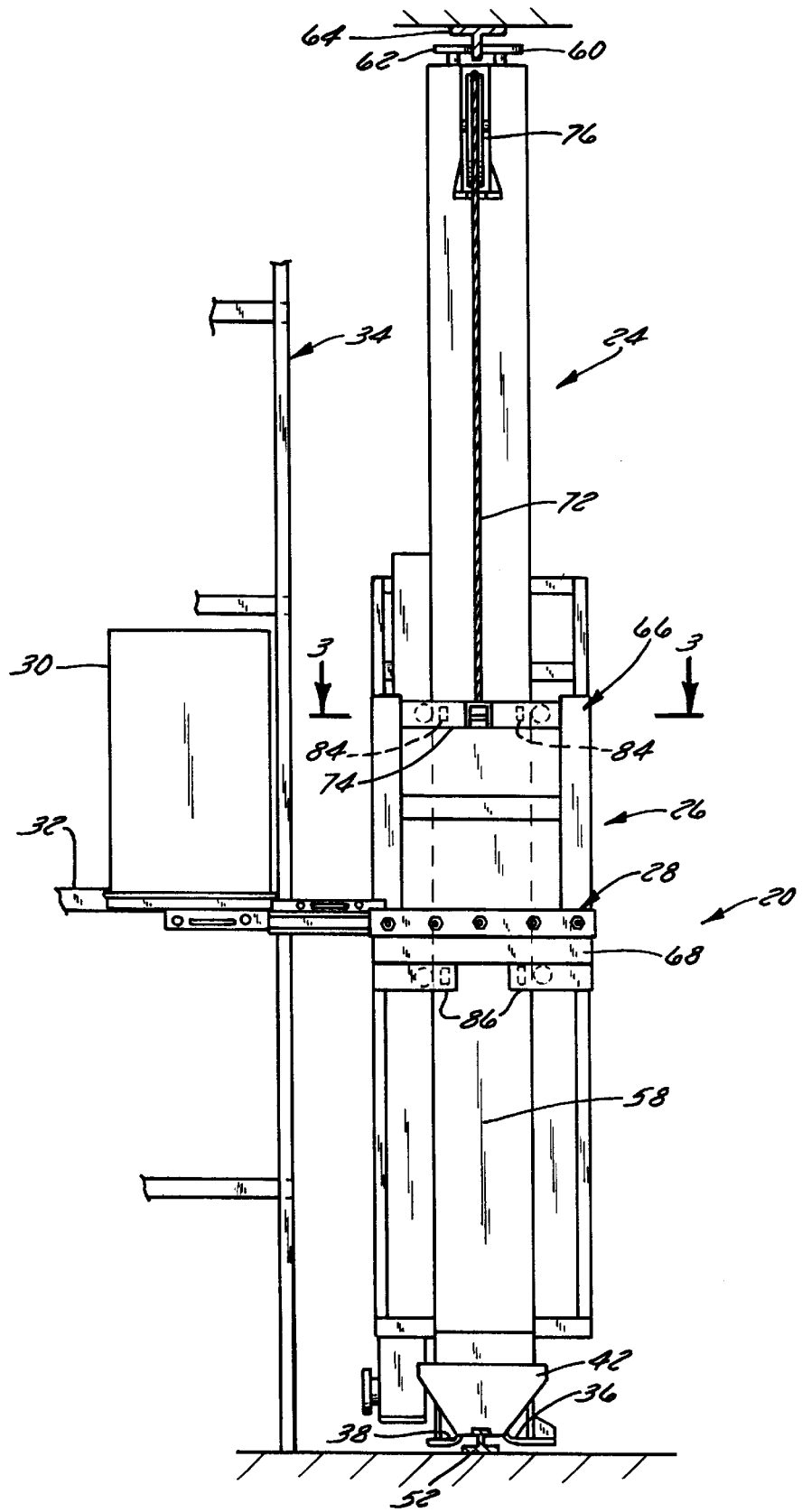
FIG. 2 is a front elevation view of the storage and retrieval machine of FIG. 1.
Figure 3:
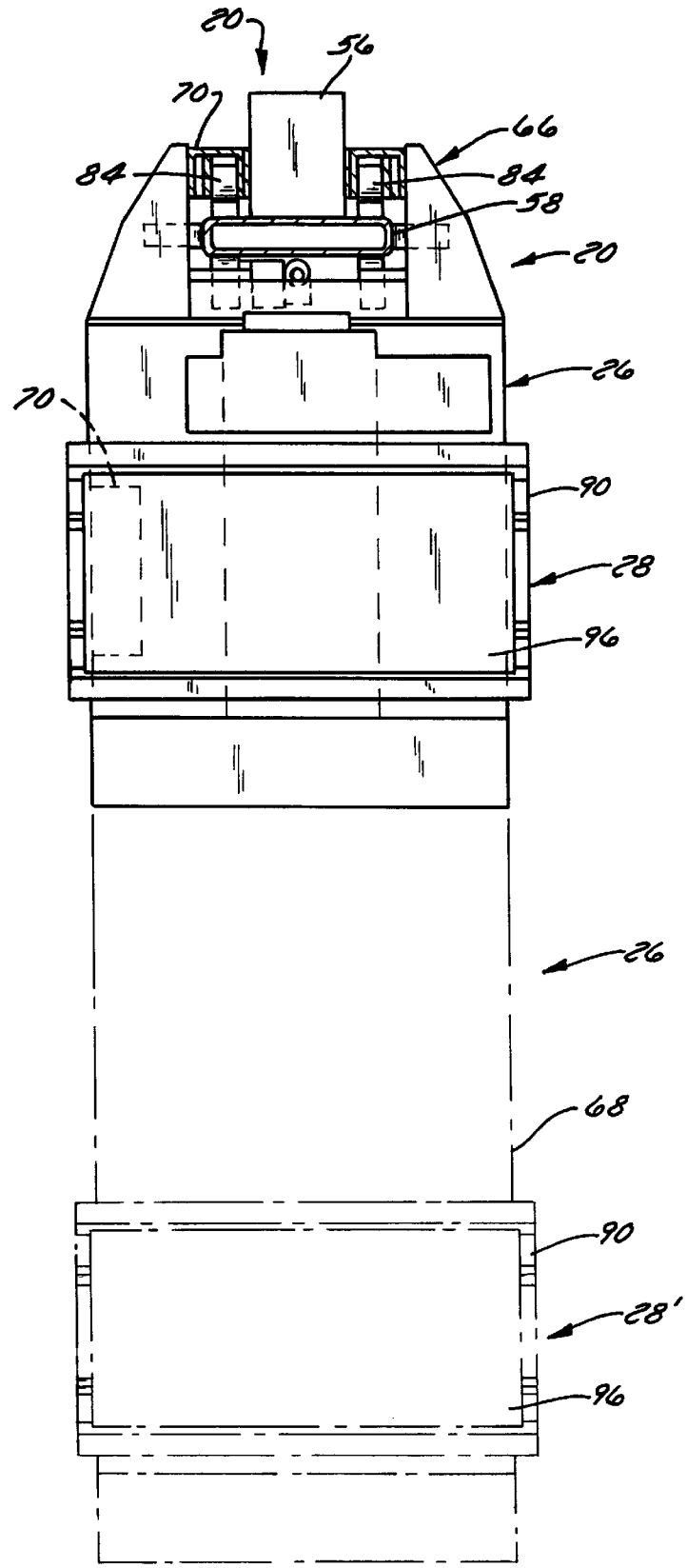
FIG. 3 is a sectional top plan view of a mast and carriage assembly of the storage and retrieval machine, taken along the lines 3—3 in FIG. 2 and modified to illustrate a double mast, two shuttle assembly.
Figure 9:
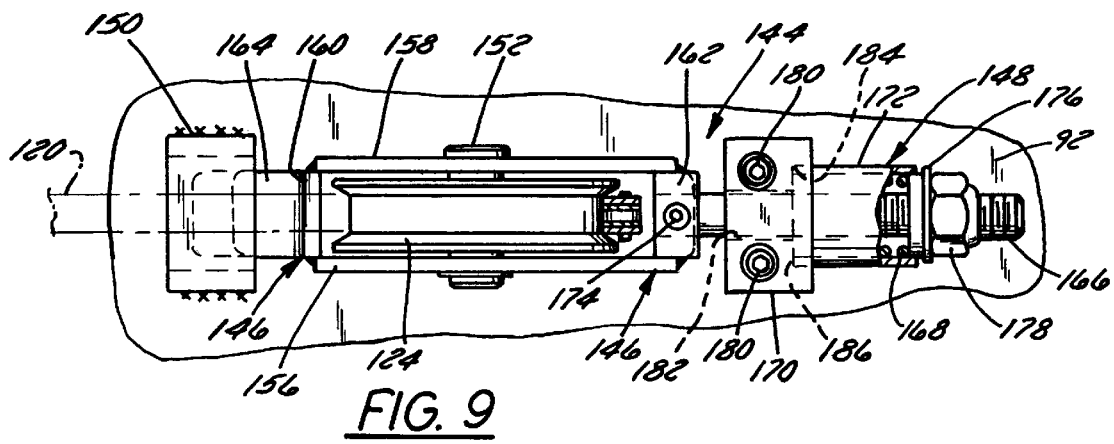
FIG. 9 is a top plan view of an idler pulley assembly of the shuttle assembly of FIGS. 5–8.
Figure 10:
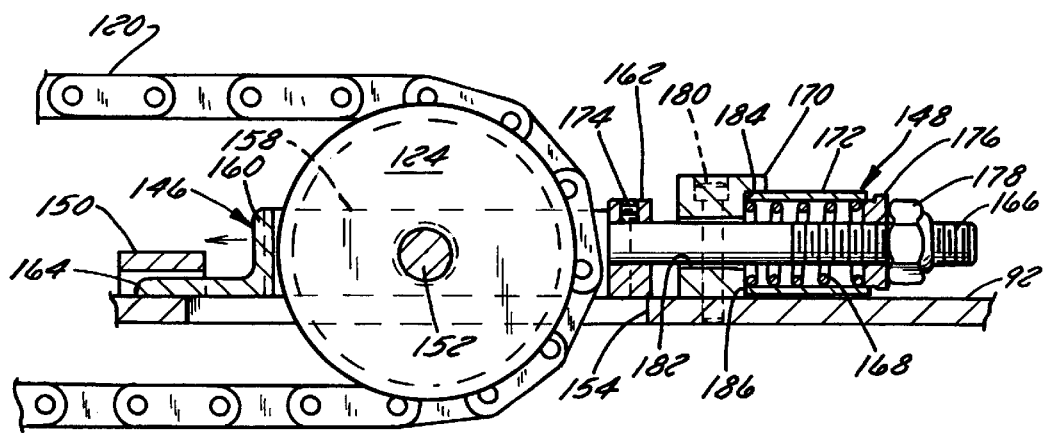
FIG. 10 is a sectional side elevation view of the idler pulley assembly of FIG. 9.
Figure 11:
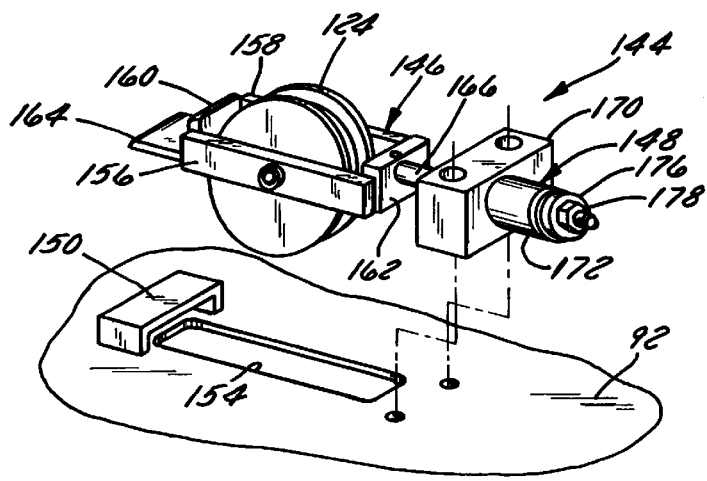
FIG. 11 is a partially-exploded perspective view of the idler pulley assembly of FIGS. 9 and 10.

Referring now to the drawings and initially to FIGS. 1–3 in particular, a storage and retrieval machine 20 with which the inventive shuttle guide roller assembly/spring tensioned shuttle pulley is usable is illustrated (FIG. 3 being modified slightly to illustrate a double mast, two shuttle assembly as opposed to the single mast, one shuttle assembly illustrated in FIGS. 1 and 2). The storage and retrieval machine 20 includes a base 22, a mast 24, a carriage 26, and one or more shuttle assemblies 28, 28'. As is standard in the art, the machine 20 is configured to selectively store a crate 30 or another item in and/or retrieve it from a designated rack 32 on a row 34 of stacked racks. The item may comprise a crate 30 as illustrated but could also comprise pallets or even much larger articles such as automobile bodies. Indeed, the illustrated machine 20 is well suited for storing or retrieving automobile bodies for reasons detailed below.

The base 22 comprises two parallel spaced apart L-shape members 36, 38 and a top plate 40. The top plate 40 extends along a substantial middle portion of the length of the base 22 and is affixed to the members 36 and 38, e.g., by welding. The base 22 also includes front and rear end trucks 42 and 44 attached to opposite ends of the members 36 and 38 and rotatably receiving front and rear wheels 46 and 48. A motor 50, mounted on the base 22, drives the rear wheel 48 so that the storage and retrieval machine 20 travels along a rail 52 or another suitable support surface to designated locations in the aisle adjacent to the stacked storage racks. The motor 50, as well as the remaining electrical components of the machine 20, are controlled by a controller 54 which is mounted on the base 22 and which receives signals from a remote source in a manner which is, per se, well known.

The mast 24 comprises an elongated rectangular frame 56 and an elongated tube 58 both of which extend vertically from the base 22. Upper guide wheels 60 and 62 are mounted on the upper end of the frame 56 and engage an upper rail 64 to guide the storage and retrieval machine 20 along the rail 64 and to maintain the machine 20 in an upright position. A carriage guide frame 66 is guided on the tube 58 and rolls far enough up the tube 58 to accommodate the maximum desired vertical movement of the carriage 26.

The carriage 26 illustrated in FIG. 3 may be relatively long so as to receive two shuttle assemblies 28, 28' and therefore is well suited for handling relatively large articles such as automobile bodies. It should be emphasized, however, that the invention is equally applicable to storage and retrieval machines having smaller carriages supporting only a single shuttle assembly. The illustrated carriage 26 is mounted on the carriage guide frame 66 for vertical movement therealong and includes a horizontal base 68 cantilevered from a vertical carriage guide frame 66. The carriage support frame 70 is movably supported on the carriage guide frame 66 via upper support rollers 84 rotatably mounted on the upper section of the carriage guide frame 66 and via lower support rollers 86 rotatably mounted on a lower section of the carriage guide frame 66. Vertical movement of the carriage 26 along the carriage guide frame 66 is effected by a rope or cable 72 which passes (1) from an upper cross-brace 74 of the carriage support frame 70, (2) over a pulley 76 located at the upper end of the mast frame 56, and (3) to a sheave or drum 78 driven by an electric motor 80 mounted on the base 22 via a support frame 82. The motor 80 is controlled by the controller 54 in a manner which is, per se, conventional and which will not be detailed.

The shuttle assemblies 28, 28' are mounted on the inboard and outboard ends, respectively, of the carriage base 68. Each shuttle assembly 28, 28' is controlled by a separate motor, but the motors of both are preferably controlled by the controller 54 to cause simultaneous and equal telescoping action of both shuttle assemblies 28, 28'. Since both shuttle assemblies 28, 28' are identical in construction and operation, only the shuttle assembly 28 will be detailed.

3. Construction of Shuttle Assembly

Referring now to FIGS. 3–8, the shuttle assembly 28 comprises a plurality, four in the illustrated embodiment, of plates 90, 92, 94, and 96. The bottom plate 90 is stationary and is affixed to the carriage base 68. The second, third, and fourth plates 92, 94, and 96 are stacked vertically above one another and are each movable transversely with respect to the mast 24, i.e., fore and aft with respect to one another, to cause the uppermost support plate 96 supporting the item 30 to extend forwardly or rearwardly, i.e., away from the carriage base 68, to retrieve items 30 from or insert items 30 on a designated rack 34. The second through fourth plates 92, 94 and 96 are driven by a drive system 97 and guided by a shuttle guide 200 as will now be detailed.

a. Shuttle Drive System Including Pre-tensioned Idler Pulley Assembly

The drive system 97 for the shuttle assembly 28 comprises a motor, a flexible master drive member, and a plurality of flexible slave drive members. The master and slave drive members preferably comprise chains, but it should be emphasized that different flexible members could conceivably be provided, especially for the master drive member. Indeed, many storage and retrieval systems employ a cable as the master drive member.

Referring especially to FIGS. 4–8, the motor comprises a bi-directional rotary electrical motor 98 mounted on the carriage base 68 and having an output shaft 100 which extends through the upper surface of the rear end portion of the first plate 90 and which receives a drive gear 102. The master drive member comprises a chain 104 which assumes a serpentine configuration. Chain 104 (1) has a first end affixed to a bracket 106 attached to the bottom of the front end portion of the second plate 92, (2) extends over the drive gear 102 and then over an idler gear 108 mounted on the front end portion of the first plate 90, and (3) terminates in a second end affixed to a bracket 110 suspended from the rear end portion of the second plate 92.

Two sets of slave chains are provided for each of the third and fourth plates 94 and 96, one for driving the plates 94 and 96 to move rearwardly and one for driving the plates 94 and 96 to move forwardly. Each of the slave chains extends from the upper surface of an end of a first plate, over a pulley mounted on the opposite end of the immediately overlying plate, and then to the bottom surface of the first end of the next adjacent overlying plate. Specifically, each forwardly acting driving slave chain 112 for the third plate 94 (1) has a first end fixed to a bracket 114 attached to the upper surface of the rear end portion of the first plate 90, (2) extends over a pulley 116 mounted on the front end portion of the second plate 92, and (3) terminates at a second end attached to a bracket 118 suspended from the lower surface of the rear end portion of the third plate 94. Similarly, each of the rearwardly acting slave chains 120 for the third plate 94 begins at a first end affixed to a bracket 122 attached to the upper surface of the front end portion of the first plate 90, extends rearwardly over a pulley 124 located at the rear end portion of the second plate 92, and then extends forwardly to terminate at a second end attached to a bracket 126 suspended from the bottom surface of the front end portion of the third plate 94. Each forwardly acting slave chain 128 for the fourth plate 96 extends from a rear bracket 130 on the upper surface of the rear end portion of the second plate 92, over a pulley 132 located at the front end portion of the third plate 94, and to a bracket 134 suspended from the rear end portion of the fourth plate 96; and each rearwardly acting slave chain 136 for the fourth plate 96 extends from a bracket 138 on the upper surface of the front end portion of the second plate 92, over a pulley 140 located at the rear end portion of the third plate 94, and to a bracket 142 suspended from the front end portion of the fourth plate 96.

Those skilled in the art will readily recognize that driving the motor 98 and master chain 104 to move the second plate 92 forwardly will result in corresponding forward movement of the third and fourth plates 94 and 96 via operation of the slave chains 112 and 128 and thus will result in forward telescopic extension of the shuttle assembly 28. Similarly, rotation of the motor 98 in the opposite direction to effect rearward movement of the second plate 92 will also effect corresponding rearward movement of the third and fourth plates 94 and 96 via operation of the slave chains 120 and 136 and consequent rearward telescopic extension.

As will be appreciated from the foregoing, during forward telescopic extension of the shuttle assembly 28, i.e., during movement of the plates 92, 94 and 96 to the left as illustrated in FIG. 8, the upper portions of the loaded slave chains 112, 128 will tend to be taut and the lower portions slack. Moreover, each slave chain 112, 120, 128, 136 undergoes cyclic loading due to accelerations and decelerations of the various plates 92, 94, and 96. Unless the chain is kept tight, the shuttle plates 92, 94 and 96 will surge, stutter, or misposition. Each of the idler pulleys 116, 124, 132 and 140 is preferably but not necessarily acted upon by a tensioning mechanism which maintains at least a minimum designated tension in all slave chains and which helps reduce slack in the undriven side of the chains. Each idler pulley 116, 124, 132 and 140 is preferably mounted on a movable support, with the slave chain 112, 120, 128 and 136 and the tensioning mechanism applying opposing biasing forces to the pulley and with the maximum movement of the pulley 116, 124, 132 and 140 away from the tensioning mechanism and therefore the maximum biasing forces imposed on the pulley by the tensioning mechanism being limited, e.g., by a stop.

Each of the idler pulleys and the corresponding tensioning mechanism are combined in an idler pulley assembly. Except for the fact that the tensioning mechanisms at opposite ends of the shuttle assembly 28 bias the corresponding idler pulleys in opposite directions, all of the idler pulley assemblies are identical in construction and operation. Accordingly, only an idler pulley assembly 144 located at the rear end portion of the second plate 92 will be described.

Referring in particular to FIGS. 8–11, the idler pulley assembly 144 includes the idler pulley 124 as well as a support frame 146, a tensioning mechanism 148, and a guide block 150. Pulley 124 is mounted on the support frame 146 and extends through a slot 154 formed in the rear end portion of the second plate 92 so as to be movable linearly within the slot 154 and so as to support the slave chain 120 as illustrated, e.g., in FIGS. 8 and 10. The support frame 146 includes transversely opposed side walls 156 and 158 and longitudinally opposed front and rear end walls 160 and 162 connected to one another to form a generally rectangular frame. A guide tongue 164 extends forwardly from the bottom surface of the front end wall 160 for reasons detailed below. The pulley 124 is mounted on the side walls 156, 158 approximately midway between the end walls 160 and 162 by a bearing 152.

The tensioning mechanism 148 is mounted on the second plate 92 and biases the support frame 146 and idler pulley 124 rearwardly. The tensioning mechanism 148 preferably comprises a rod 166, a spring 168, a rod guide 170, and a spring guide 172. The rod 166 has (1) a front end attached to the rear end wall 162 of the support frame 146 by a set screw 174 and (2) a threaded rear end portion which slidably receives a plunger 176 and a nut 178. The spring 168 surrounds the rod 166 and engages the plunger 176 to bias the plunger 176 and thus the support frame 146 and the pulley 124 rearwardly. The spring 168 could comprise any suitable compression spring but preferably comprises a two inch die spring which provides relatively high biasing forces in a relatively small space and with a relatively short stroke. The rod guide 170 is attached by bolts 180 to the rear end portion of the second plate 92 at a location behind the slot 154. The rod guide 170 has (1) an aperture 182 formed therethrough which slidably receives the rod 166 and (2) a rear surface 184 which is preferably counterbored to form a spring seat. The spring guide 172 is cylindrical, surrounds the spring 168, and has a rear end affixed to the plunger 176. The front end of the spring guide 172 forms a stop 186 which extends into the counterbore in the rear surface 184 of the rod guide 170. The stop 186 engages the rear surface of the rod guide 170 when tensions imposed on the rod 166 by the spring 168 are overcome by tensions imposed on the rod 166 and idler pulley 124 by the second slave chain 120, thereby to prevent further forward movement of the support frame 146 and the pulley 124 and to define a maximum force imposable by the spring 168.

It can thus be seen that the tensioning mechanism 148 maintains tension on the chain 120 at all times and also helps keep the undriven side of the chain 120 taut when the chain 120 is loaded. In addition, the use of the stop 186 limits the maximum compression of the spring 168 and thus the maximum tension imposable on the chain 120 by the spring 168, thereby helping prevent the chain 120 or the pulley 124 from becoming overloaded.

b. Shuttle Guide Assembly Including Shuttle Guide Roller Assembly

Referring now especially to FIGS. 4–6 and 12–14, the shuttle guide assembly 200 comprises a system of support roller assemblies and guide roller assemblies which support the plates 92, 94, and 96 on the carriage 26 and which guide the plates 92, 94, and 96 for fore and aft movement with respect to one another during shuttle extension and retraction. A first pair of laterally opposed, longitudinally extending rails 202 and 204 are attached to and extend upwardly from recessed flanges 203 and 205 located at opposed lateral side portions of the second plate 92. A second pair of laterally opposed, longitudinally extending rails 206 and 208 are attached to and depend from opposed sides of the fourth plate 96. First and second laterally opposed and longitudinally extending main support bars 210 and 212 are attached to and extend upwardly from the first plate 90 at locations laterally adjacent the first and second rails 202 and 204. Third and fourth laterally opposed and longitudinally extending support bars 214 and 216 are attached to lateral edges of the third plate 94 so as to extend both above and below the third plate 94 and so as to be located laterally adjacent the first through fourth rails 202, 204, 206 and 208. Each of the rails 202, 204, 206, and 208 includes a central vertical web 218 and vertically spaced, inwardly extending horizontal flanges 220 and 222. The first and second rails 202 and 204 additionally include vertically spaced, outwardly extending horizontal flanges 224 and 226.

First and second sets of load-bearing rollers 228 and 230 are attached to the first and second main support bars 210 and 212 so as to be rotatable about a horizontal axis and so as to engage the outwardly extending flanges 224 and 226 of the first and second rails 202 and 204, thereby supporting the first and second rails 202 and 204 and thus the second plate 92 on the first plate 90. Third and fourth sets of load-bearing rollers 232 and 234 are attached to the lower portion of the main support bars 214 and 216 so as to be rotatable about a horizontal axis and so as to engage the inwardly extending flanges 220 and 222 on the first and second rails 202 and 204, thereby supporting the second and third main support bars 214 and 216 and the third plate 94 on the first and second rails 202 and 204 and thus on the second plate 92. Finally, fifth and sixth sets of load-bearing rollers 236 and 238 extend laterally outwardly from the upper portions of the third and fourth support bars 214 and 216 and are attached to the third and fourth main support bars so as to be rotatable about a horizontal axis. The fifth and sixth sets of load-bearing rollers 236 and 238 engage the flanges 220 and 222 on the third and fourth rails 206 and 208 so as to support the third and fourth rails 206 and 208 and thus the fourth plate 96 on the third plate 94.

Each of the load-bearing rollers 228, 230, 232, 234, 236 and 238 is rotatably mounted on the corresponding main support bar 210, 212, 214, and 216 in an identical manner. Thus, referring to FIG. 12 which illustrates the rollers 230 and 234, each of the rollers 230 and 234 is rotatably mounted on a threaded shaft 240 which extends through an aperture in the main support bar 216 and which is held in place by a nut 242.

The purpose of the guide rollers is to assure smooth linear movement of the movable plates 92, 94, and 96 during telescopic extension and retraction of the shuttle assembly 28 and to center the movable plates 92, 94, and 96 on the tracks or rails along which they are driven. Accordingly, first through sixth sets of guide rollers 250, 252, 254, 256, 258, and 260 are provided, each of which (1) is positioned generally co-planar with a corresponding set of load-bearing rollers 228, 230, 232, 234, 236, or 238, (2) is rotatable about a vertical axis, and (3) engages the web 218 forming the guide surface of a corresponding rail 202, 204, 206, or 208.

Needless to say, the benefits provided by the guide rollers 250, 252, 254, 256, 258, and 260 are not obtained if the guide rollers do not contact the rail webs or another guide surface. The guide rollers 250, 252, 254, 256, 258, and 260 therefore must be held in a position in which they engage the webs 218 for rolling movement therealong. Guide roller positioning traditionally was performed by inserting one or more shims between the support for each guide roller and the main support plate. However, this shimming process, performed by trial and error, was tedious and often was hindered by the fact that many of the guide rollers were not easily accessible, particularly in shuttle assemblies of the illustrated type which have three, four, or even more stacked telescoping plates which hinder access to guide rollers associated with underlying plates. Moreover, shimmed guide rollers are permanently fixed in position and thus cannot accommodate non-linearities in rail webs or main support bars or other factors resulting in variations in clearance between guide rollers and the corresponding webs or other guide surfaces, nor can they compensate for roller wear or guide surface wear.

Pursuant to the invention, these potential defects are overcome by incorporating the guide rollers 250, 252, 264, 256, 258, or 260 of each set into one or more shuttle guide roller assemblies which pretension the guide rollers into contact with the rail web 218 while permitting limited transverse movement of the guide rollers with respect to the main support bars 210, 212, 214, and 216 so as to accommodate variations in clearance between the guide rollers and the corresponding rail webs 218. The guide rollers of each set are grouped in assemblies spaced along the corresponding rail web in numbers and locations to optimize shuttle plate guidance. The length and numbers of guide rollers in each guide roller assembly also preferably vary from location to location.

Figure 12:
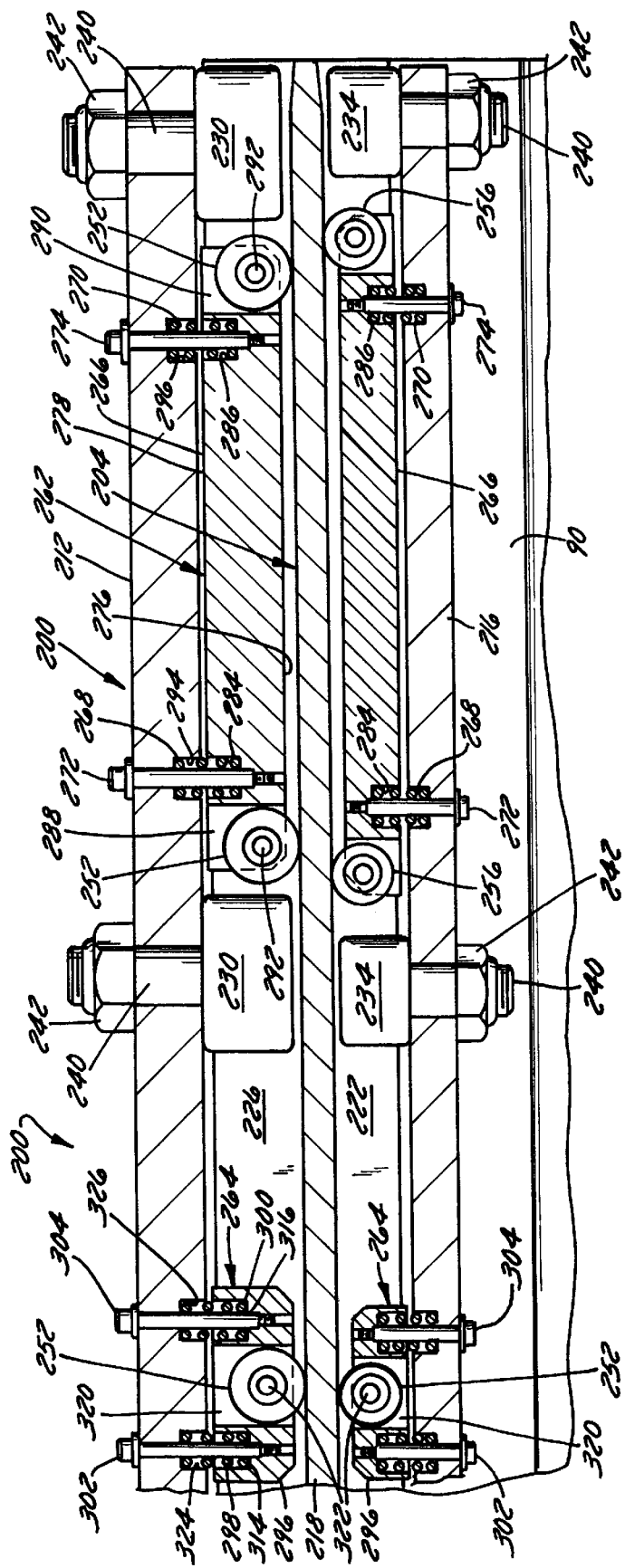
FIG. 12 is a fragmentary sectional plan view of the shuttle assembly of FIGS. 4–8 showing load and side guide rollers.
Figure 13:
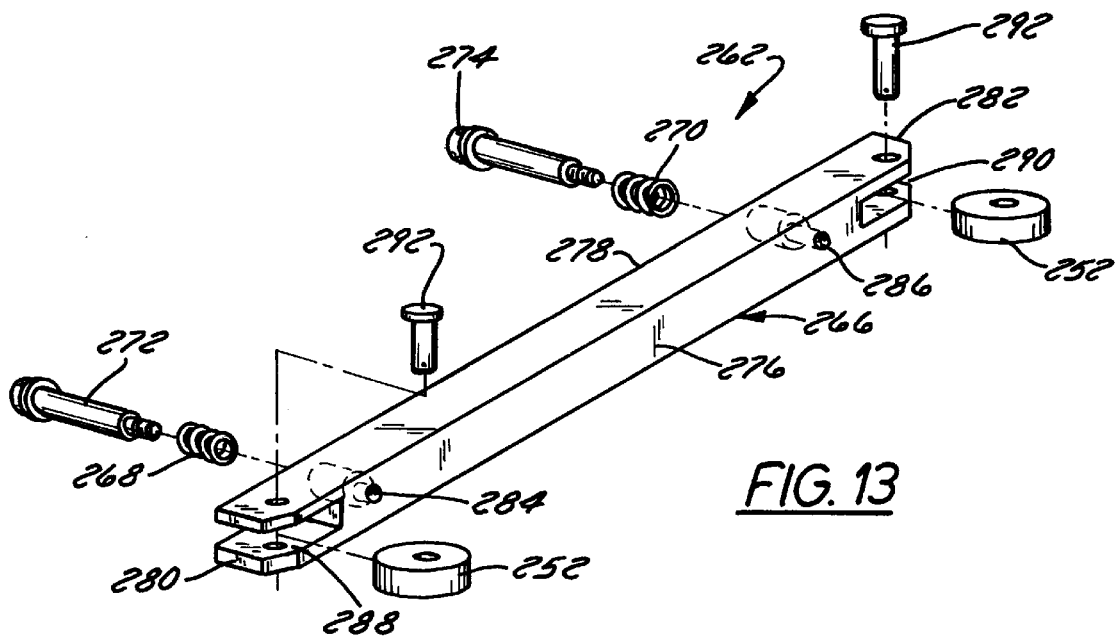
FIG. 13 is an exploded perspective view of a first guide roller assembly of the shuttle assembly of FIGS. 5–9.
Figure 14:
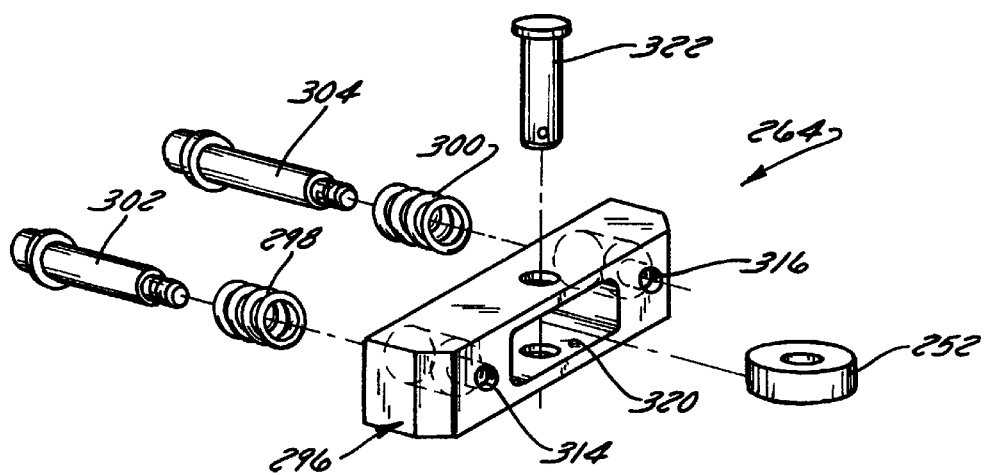
FIG. 14 is an exploded perspective view of a second guide roller assembly of the shuttle assembly of FIGS. 5–9.

Referring to FIGS. 12 through 14, two exemplary guide roller assemblies 262, 264 are illustrated having two guide rollers and one guide roller, respectively, it being understood that guide roller assemblies could be constructed having three or more guide rollers.

Referring especially to FIG. 13, the guide roller assembly 262 includes, in addition to the guide roller 252, a guide roller support bar 266, two springs 268, 270, and two bolts 272, 274. The guide roller support bar 266 is designed to support two guide rollers 252 and to resiliently bias the guide rollers 252 into contact with the rail web 218 forming the guide surface of the associated rail 204 (FIG. 12). The guide rail support bar 266 has an inner face 276, an outer face 278, a front end 280, and a rear end 282. Bores 284, 286 extend transversely through the front and rear ends 280, 282 of the support bar 266 and are each tapped at their inner end and counterbored at their outer end. The guide rollers 252 are mounted in horizontally extending slots 288 and 290 formed in the ends 280 and 282 of the support bar 266 and are each held in place by a pin 292 extending vertically through the roller 252 and the support bar 266 so as to permit the guide roller 252 to rotate about a vertical axis. The guide roller support bar 266 is bolted to the main support bar 214 by the bolts 272 and 274 which are threaded into the tapped ends of the bores 284, 286 and which extend through mating bores 294, 296 (FIG. 12) in the main support bar 214.

Each spring 268 and 270 has an inner end located in the counterbore of corresponding bore 284, 286 of the guide roller support bar 266 and an outer end located in the corresponding counterbore 294, 296 in the main support bar 214. Die springs are preferred because they are relatively strong or compact. The die springs 268 and 270 bias the guide roller support bar 266 and the corresponding guide rollers 252 into contact with the rail web 218 but permit the guide roller support bar 266 and guide rollers 252 to move transversely with respect to the rail web 218.

The guide roller assembly 264 (FIGS. 12 and 14) differs from the guide roller assembly 262 (FIGS. 12 and 13) only in that it has a shorter guide roller support bar 296 and a single guide roller 252 located midway between the bolts 302, 304. The guide roller assembly 264 is otherwise identical to the guide roller assembly 262 and include (1) mating bores 314, 316, 324, 326, in the main support bar 212 and the guide roller support bar 296, (2) springs 298, 300 seated in the mating counterbores 314, 316, 324, and 326, (3) bolts 302, 304 attaching the guide roller support bar 296 to the main support bar 214, and (4) a pin 322 rotatably supporting the guide roller 252 in a central slot 320 in the guide roller support bar 296.

The magnitude of forces to be imposed by the guide roller centering springs 268, 270, 298, 300 preferably varies from plate to plate, with the magnitude of forces required for the rollers 250, 252 guiding the second plate 92 being the greatest. Preferably, the die springs 268, 270, etc. associated with the first and second sets of guide rollers 250, 252 have a free length of 1¾ inches and exert a maximum biasing force of about 400 to 570 pounds. The die springs 268, 270, etc. associated with the third and fourth sets of guide rollers 254, 256 have a free length of 1½ inches and establish a maximum biasing force of about 215–300 pounds. The die springs 268, 270, etc. associated with the fifth and sixth sets of guide rollers 258, 260 have a free length of 1 inch and exert a maximum biasing force of about 130–180 pounds. Of course, the counterbores in the main support bars 210, 212, 214 and 216 and the guide roller support bars 266 and 296 are dimensioned to accommodate these different spring sizes.

4. Operation of Storage and Retrieval Machine

In operation, assuming that one desires to insert an item 30 into a particular rack 32 on the stack 34, the storage and retrieval machine 20 is driven along the rail 52 by the motor 50 to position the carriage 26 in the same vertical plane as the designated rack 32. The motor 80 is then energized to raise the carriage 26 to a location in which the shuttle assemblies 28, 28' are adjacent the bottom of the designated rack 32. The motors 98 are then energized to effect telescopic extension of the plates 92, 94, and 96 of each of the shuttle assemblies 28, 28' via operation of the master chain 104 and the slave chains 112 and 128 of each shuttle assembly, thereby positioning the item 30 within the rack 32. The carriage 26 is then lowered slightly to transfer the item 30 to the floor of the rack 32, and the motor 98 is driven in the opposite direction to withdraw the shuttle plates 92, 94, 96 from the rack 32 via action of the chains 104, 120, and 136.

Tension is maintained on both the upper and lower portions of each of the slave chains 112, 120, 128, and 136 throughout telescopic extension and retraction of each shuttle assembly 28, 28' by the tensioning mechanisms 148 of the idler pulley assemblies 144. The tensioning mechanisms 148 damp undulations in shuttle plate movement which otherwise could occur due to cyclic loading of the chains. Premature pulley and chain wear are avoided or at least inhibited because the resistive force imposed by the spring 168 of each tensioning mechanism 148 is variable and cannot exceed a designated magnitude achieved when the stop 186 engages the rod guide 170.

The plates 92, 94, and 96 of each shuttle assembly 28, 28' are guided for smooth longitudinal movement along the rails 202, 204, 206, and 208 during telescopic shuttle guide extension and retraction by the guide rollers 250, 252, 254, 256, and 258. Contact between the guide rollers 250, 252, 256, 268, and 260 and the rail webs 218 is maintained, even in the presence of variations in clearance between the rail webs 218 and main support bars 210, 212, 214 and 216, without overstressing either the guide rollers or the rail webs, by the die springs 268, 270, 298, and 300 and corresponding components of the guide roller support assemblies 262 and 264 which permit limited transverse movement of each guide roller support bar 266, 296 with respect to the corresponding main support bar 210, 212, 214 or 216. Moreover, each shuttle plate 92, 94, or 96 "floats" between sets of spring loaded guide rollers at each side of the plate. Centricity of the shuttle plates 92, 94, or 96 during shuttle plate movement therefore is assured because any side-to-side movement of the shuttle plates 92, 94, and 96 is resisted by differential compression of the springs 268, 270, 298, and 300 on the opposite side of the shuttle plates, causing the shuttle plates to recenter. Moreover, the guide rollers 250, 252, 256, 268, and 260 are self-adjusting due to the biasing effects of the springs 268, 270, 298, and 300. Effective plate guidance therefore is assured even upon roller or rail web wear.

Many changes and modifications could be made to the invention as described above without departing from the spirit of the invention. The scope of these changes will become apparent from the appended claims.

We claim:

1. A storage and retrieval machine comprising:
   (A) a base configured for horizontal movement with respect to a support surface;
   (B) a mast mounted on said base;
   (C) a carriage mounted on said mast and configured for vertical movement along said mast;
   (D) a shuttle assembly supported on said carriage, said shuttle assembly comprising
      (1) a first plate,
      (2) a second plate which is positioned above said first plate and which is movable fore and aft with respect to said first plate,
      (3) a rail which is attached to one of said first and second plates and which is located between said first and second plates, said rail including a central web and a flange extending laterally away from said web,
      (4) a main support bar which is attached to the other of said first and second plates, which is positioned vertically between said first and second plates, and which extends substantially in parallel with said rail,
      (5) a plurality of load-bearing rollers attached to said main support bar so as to be rotatable about a horizontal axis, said load-bearing rollers engaging said flange of said rail to support said second plate on said first plate, and
      (6) a shuttle guide roller assembly, said shuttle guide roller assembly including
         (a) a guide roller which is supported on said main support bar so as to be rotatable about a vertical axis, so as to engage said web of said rail, and so as to be capable of limited transverse movement with respect to said main support bar, and
         (b) a spring which resiliently biases said guide roller towards said web.

2. A storage and retrieval machine comprising:
   (A) a base configured for horizontal movement with respect to a support surface;
   (B) a mast mounted on said base;
   (C) a carriage mounted on said mast and configured for vertical movement along said mast;
   (D) a shuttle assembly supported on said carriage, said shuttle assembly comprising
      (1) a first plate,
      (2) a second plate which is positioned above said first plate and which is movable fore and aft with respect to said first plate,
      (3) a rail which is attached to one of said first and second plates and which is located between said first and second plates, said rail including a central web and a flange extending laterally away from said web,
      (4) a main support bar which is attached to the other of said first and second plates, which is positioned vertically between said first and second plates, and which extends substantially in parallel with said rail,
      (5) a plurality of load-bearing rollers attached to said main support bar so as to be rotatable about a horizontal axis, said load-bearing rollers engaging said flange of said rail to support said second plate on said first plate, and
      (6) a shuttle guide roller assembly, said shuttle guide roller assembly including (a) a guide roller which is supported on said main support bar so as to be rotatable about a vertical axis, so as to engage said web of said rail, and so as to be capable of limited transverse movement with respect to said main support bar, and (b) a spring which biases said guide roller towards said web, wherein said shuttle guide roller assembly further comprises a guide roller support bar which is attached to said main support bar and which has an inner face, an outer face, a front end, and a rear end, said guide roller being mounted on said guide roller support bar and extending inwardly from said inner face, said outer face having a counterbore formed therein, and wherein said spring comprises a die spring which engages said main support bar and a portion of which is disposed within said counterbore in said outer face of said guide roller support bar.

3. A storage and retrieval machine as defined in claim 2, wherein a counterbore is formed in said main support bar adjacent said counterbore in said guide roller support bar, and wherein said die spring extends into said counterbore in said main support bar.

4. A storage and retrieval machine as defined in claim 2, wherein said guide roller support bar is mounted on said main support bar by a bolt which extends through said die spring and said counterbore in said guide roller support bar.

5. A storage and retrieval machine as define in claim 4, wherein said die spring and said bolt are disposed between said guide roller and said front end of said guide roller support bar, and further comprising a second die spring and a second bolt disposed between said guide roller and said rear end of said guide roller support bar.

6. A storage and retrieval machine as defined in claim 4, wherein said guide roller is disposed between said die spring and said front end of said guide roller support bar, wherein a second counterbore is formed in said guide roller support bar between said guide roller and said rear end of said guide roller support bar, and wherein said guide roller assembly further comprises (1) a second guide roller which is mounted on said guide roller support bar behind said second counterbore so as to be rotatable about a vertical axis and which extends inwardly from said inner face of said guide roller support bar, and (2) a second die spring which engages said main support bar and a portion of which is disposed within said second counterbore in said outer face of said guide roller support bar.

7. A storage and retrieval machine comprising:

(A) a base configured for horizontal movement with respect to a support surface;

(B) a mast mounted on said base;

(C) a carriage mounted on said mast and configured for vertical movement along said mast;

(D) a shuttle assembly supported on said carriage, said shuttle assembly comprising (1) a first plate, (2) a second plate which is positioned above said first plate and which is movable fore and aft with respect to said first plate, (3) a rail which is attached to one of said first and second plates and which is located between said first and second plates, said rail including a central web and a flange extending laterally away from said web, (4) a main support bar which is attached to the other of said first and second plates, which is positioned vertically between said first and second plates, and which extends substantially in parallel with said rail, (5) a plurality of load-bearing rollers attached to said main support bar so as to be rotatable about a horizontal axis, said load-bearing rollers engaging said flange of said rail to support said second plate on said first plate, and (6) a shuttle guide roller assembly, said shuttle guide roller assembly including (a) a guide roller which is supported on said main support bar so as to be rotatable about a vertical axis, so as to engage said web of said rail, and so as to be capable of limited transverse movement with respect to said main support bar, and (b) a spring which biases said guide roller towards said web wherein said first plate is stationary, wherein said rail is attached to said second plate, wherein said main support bar comprises a first main support bar which faces a first side of said web and which extends upwardly from an upper surface of said first plate, wherein said rail further comprises a second flange extending away from a second side of said web, wherein said load-bearing rollers collectively comprise a first set of support rollers, and wherein said shuttle assembly further comprises (1) a third plate disposed above said second plate, (2) a second main support bar which is attached to said third plate, which is positioned between said third and second plates, which faces said second side of said web, and which extends substantially in parallel with said rail, (3) a second set of load-bearing rollers attached to said second main support bar so as to be rotatable about a horizontal axis, said second set of load-bearing rollers engaging said second flange of said rail to support said third plate on said second plate, and (4) a second shuttle guide roller assembly, said second shuttle guide roller assembly including (a) a second guide roller which is supported on said second main support bar so as to be rotatable about a vertical axis and so as to engage said second side of said web, and (b) a second spring which biases said second guide roller towards said second side of said web.

8. A storage and retrieval machine as defined in claim 7, wherein a lower portion of said second main support bar extends beneath said third plate and an upper portion of said second main support bar extends above said third plate, and wherein said shuttle assembly further comprises (1) a fourth plate which is positioned above said third plate and which is movable fore and aft with respect to said third plate, (2) a second rail which is attached to said fourth plate and which is located between said fourth and third plates, said second rail including a central web and a flange extending laterally away from said web, (3) a third set of load-bearing rollers attached to said upper portion of said second main support bar so as to be rotatable about a horizontal axis, said third set of load-bearing rollers engaging said flange of said second rail to support said fourth plate on said third plate, and (4) a third shuttle guide roller assembly, said third shuttle guide roller assembly including (a) a third guide roller which is supported on said upper portion of said second main support bar so as to be rotatable about a vertical axis and so as to engage said web of said second rail, and (b) a third spring which biases said third guide roller towards said web of said second rail.

9. A shuttle assembly for a storage and retrieval machine, said shuttle assembly comprising:
   (1) first and second vertically-spaced plates;
   (2) a rail which is attached to said first plate and which is located between said first and second plates;
   (3) a main support bar which is attached to said second plate and which extends substantially in parallel with said rail; and
   (4) a shuttle guide roller assembly including
      (A) a guide roller which is supported on said main support bar so as to be rotatable about a vertical axis, so as to engage said rail, and so as to be capable of limited transverse movement with respect to said main support bar, and
      (B) a spring which resiliently biases said guide roller towards said rail.

10. A shuttle assembly for a storage and retrieval machine, said shuttle assembly comprising (1) first and second vertically-spaced plates; (2) a rail which is attached to said first plate and which is located between said first and second plates; (3) a main support bar which is attached to said second plate and which extends substantially in parallel with said rail; and (4) a shuttle guide roller assembly including:
   (A) a guide roller which is supported on said main support bar so as to be rotatable about a vertical axis, so as to engage said rail, and so as to be capable of limited transverse movement with respect to said main support bar;
   (B) a spring which biases said guide roller towards said rail; and
   (C) a guide roller support bar which is attached to said main support bar and which has an inner face, an outer face, a front end, and a rear end, said guide roller being mounted on said guide roller support bar and extending inwardly from said inner face, said outer face having a counterbore formed therein, wherein
      said spring comprises a die spring which engages said main support bar and a portion of which is disposed within said counterbore in said outer face of said guide roller support bar.

11. A shuttle assembly as defined in claim 10, wherein a counterbore is formed in said main support bar adjacent said counterbore in said guide roller support bar, and wherein said die spring extends into said counterbore in said main support bar.

12. A shuttle assembly as defined in claim 10, wherein said guide roller support bar is mounted on said main support bar by a bolt which extends through said die spring and said counterbore in said guide roller support bar.

13. A shuttle assembly as define in claim 12, wherein said die spring and said bolt are disposed between said guide roller and said front end of said guide roller support bar, and further comprising a second die spring and a second bolt disposed between said guide roller and said rear end of said guide roller support bar.

14. A shuttle assembly as defined in claim 12, wherein said guide roller is disposed between said die spring and said front end of said guide roller support bar, wherein
   a second counterbore is formed in said guide roller support bar between said guide roller and said rear end of said guide roller support bar, and wherein
   said guide roller assembly further comprises (1) a second guide roller which is mounted on said guide roller support bar behind said second counterbore so as to be rotatable about a vertical axis and which extends inwardly from said inner face of said guide roller support bar, and (2) a second die spring which engages said main support bar and a portion of which is disposed within said second counterbore in said outer face of said guide roller support bar.

* * * * *